(12) United States Patent
Matsunaga et al.

(10) Patent No.: US 10,498,272 B2
(45) Date of Patent: Dec. 3, 2019

(54) CONTROL DEVICE OF ELECTRIC ROTATING MACHINE

(71) Applicant: Mitsubishi Electric Corporation, Tokyo (JP)

(72) Inventors: Takanori Matsunaga, Tokyo (JP); Ryo Nakamura, Tokyo (JP); Kenichi Akita, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 0 days.

(21) Appl. No.: 15/801,751

(22) Filed: Nov. 2, 2017

(65) Prior Publication Data

US 2018/0351493 A1 Dec. 6, 2018

(30) Foreign Application Priority Data

May 31, 2017 (JP) ................. 2017-107348

(51) Int. Cl.
*H02P 9/30* (2006.01)
*H02P 6/32* (2016.01)
*H02P 9/48* (2006.01)
*H02P 101/45* (2016.01)

(52) U.S. Cl.
CPC ............. *H02P 9/305* (2013.01); *H02P 6/32* (2016.02); *H02P 9/48* (2013.01); *H02P 2101/45* (2015.01); *H02P 2207/05* (2013.01)

(58) Field of Classification Search
CPC .. H02P 9/48; H02P 9/302; H02P 9/305; H02P 6/32
USPC ........................................................ 322/59
See application file for complete search history.

(56) References Cited

U.S. PATENT DOCUMENTS

| 2006/0022647 A1* | 2/2006 | Asada .................. H02J 7/1446 |
| | | 322/28 |
| 2011/0241598 A1* | 10/2011 | Yamada ................. B60L 15/20 |
| | | 318/716 |
| 2012/0262130 A1 | 10/2012 | Nakajima et al. |

(Continued)

FOREIGN PATENT DOCUMENTS

| JP | 62-203599 A | 9/1987 |
| JP | 2008-182879 A | 8/2008 |

(Continued)

OTHER PUBLICATIONS

Communication dated Mar. 6, 2018 from the Japanese Patent Office in counterpart application No. 2017-107348.

*Primary Examiner* — Sean Gugger
(74) *Attorney, Agent, or Firm* — Sughrue Mion, PLLC; Richard C. Turner

(57) ABSTRACT

A field circuit includes a positive pole side switching element which is for controlling field current that flows in a field winding and a negative pole side switching element which is for interrupting the field current; a field circuit control section includes a field high-speed interruption determination block and a field current interruption speed control block; and at the time of interrupting the field current at a high speed, the field current is interrupted immediately by turning OFF both switching elements of the positive pole side and the negative pole side and interruption speed of the field current is controlled by intermittently driving the negative pole side switching element.

5 Claims, 9 Drawing Sheets

(56) References Cited

U.S. PATENT DOCUMENTS

2017/0077853 A1* 3/2017 Zook .................... H02P 9/48
2017/0294857 A1* 10/2017 Seki .................... H02P 9/305

FOREIGN PATENT DOCUMENTS

JP   2012-223073 A   11/2012
JP   2013-255389 A   12/2013

* cited by examiner

CONTROL DEVICE OF ELECTRIC ROTATING MACHINE

BACKGROUND OF THE INVENTION

1. Field of the Invention

The present invention relates to control devices of electric rotating machines and, more particularly, relates to a control device of a winding field type alternating current (AC) electric rotating machine having an armature winding and a field winding, which is mainly mounted on a vehicle, is connected to an internal combustion engine and a battery, is operated as an electric motor that starts and assists the internal combustion engine, and is also operated as the electric motor that charges the battery.

2. Description of the Related Art

In recent years, developments and practical applications of a vehicle, what is called, a hybrid vehicle provided with an engine and a power source other than that, for example, an electric rotating machine have been being advanced from a standpoint of demands on an improvement of fuel consumption of the vehicle and/or environmental protection. In the vehicle such as this, separate use between the engine corresponding to a running state and the power source other than that and appropriate allocation are needed. For example, in order to suppress unnecessary fuel consumption due to idling of the engine, there has been adopted an idling stop in many vehicles. The idling stop is such that the electric rotating machine restarts an internal combustion engine in the case of sensing a start intention of a driver, for instance, the internal combustion engine is stopped when the vehicle stops due to signals, traffic snarl-up, or the like and then handle operation and/or a brake is loosened.

Since the electric rotating machine mounted on the vehicle such as this is connected to the engine and is operated in a state capable of transmitting and receiving torque, rotation speed of the electric rotating machine is also largely fluctuated due to fluctuations in rotation speed of the engine and a required operational rotation speed range is also wide. Thus, the electric rotating machine is not a permanent magnet type in which magnets are incorporated in a rotor, but there has been widely adopted a winding field type electric rotating machine that is easy to control induced voltage in response to the rotation speed.

In order to deal with the above idling stop, the electric rotating machine needs to output large torque at the time of low speed rotation at which the restart of the internal combustion engine is needed and an improvement in output is achieved by raising a battery voltage serving as power supply to a higher voltage.

In the control device of the winding field type electric rotating machine such as this, there is known a method by, for example, Patent document 1, in which a temperature rise is suppressed and excessive suppression of power generation current is prevented to enlarge a normal power generation area by controlling the amount of current for rotor winding field in response to the temperature of a power converter unit or the like and the rotation speed.

Patent Document 1: JP-A-2012-223073

However, as in Patent Document 1, when field current control is performed by a single switching element, inductance in a field winding is larger as compared to inductance in an armature winding; and accordingly, control responsiveness is low and it is needed to wait until field current that flows in the field winding becomes small to some extent so that unintentional power generation, driving operation, and/or rapid change in torque due to residual magnetic flux of the field winding is not generated at the time of switching of operation, for instance, from power generation to driving and/or from driving to power generation in the electric rotating machine.

Furthermore, current of the field winding cannot be interrupted at a high speed; and accordingly, when an abnormal voltage fluctuation such as a load dump surge is generated, power generation due to the residual magnetic flux of the field winding and engine rotation is continued and a battery and/or other electrical loads are likely to be broken.

SUMMARY OF THE INVENTION

The present invention has been made to solve the problem described above, and an object of the present invention is to obtain a control device of an electric rotating machine in which interruption speed of field current of a field winding can be arbitrarily controlled, as a result, it is not needed to wait until current that flows in the field winding becomes small at the time of switching of operation, for instance, from power generation to driving and/or from driving to power generation in the electric rotating machine and high speed switching can be achieved.

According to the present invention, there is provided a control device of an electric rotating machine having an armature winding and a field winding, the control device of the electric rotating machine including: a bridge circuit configured to include positive pole side arm switching elements and negative pole side arm switching elements, and to rectify AC current serving as the output of the armature winding into DC current; a field circuit configured to perform current conduction control of the field winding by using field switching elements; and a control unit configured to include a bridge circuit control section and a field circuit control section which perform control of ON and OFF of the switching elements of the bridge circuit and the field circuit. The field circuit includes: a positive pole side field switching element configured to perform PWM control of field current that flows in the field winding; and a negative pole side field switching element configured to interrupt the field current that flows in the field winding. The field circuit control section of the control unit includes: a field current detection block configured to detect a field current value from operating state information of the electric rotating machine; a field current control calculation block configured to calculate a field current target value of the field circuit from the output of the field current detection block and target torque; a field high-speed interruption determination block configured to output a determination value as to whether or not high-speed interruption of the field current is needed from the output of the field current detection block and the output of the field current control calculation block; a field current interruption speed control block configured to calculate interruption speed necessary for interruption of the field current from the output of the field high-speed interruption determination block, and to control the interruption speed of the field current in response to a calculation result thereof; and a field gate control block configured to output operation signals of an upper (positive pole side) gate and a lower (negative pole side) gate of the field circuit in response to the output from the field current control calculation block and the output from the field current interruption speed control block. The field current that flows in the field winding is interrupted by turning OFF the positive pole side and negative pole side switching elements of the field winding in response to the output of the field high-speed interruption determination block; and the interruption speed of the field current that flows in the field winding is controlled by intermittently driving the negative pole side switching element.

According to the control device of the electric rotating machine of the present invention, the interruption speed of the field current of the field winding can be arbitrarily controlled, whereby it is not needed to wait until the current that flows in the field winding becomes small at the time of switching of operation, for instance, from power generation to driving and/or from driving to power generation in the electric rotating machine and high speed switching can be achieved.

Furthermore, in the case where there is a concern of a rapid change, such as a torque release and/or a torque difference, which are generated when the field current is interrupted at a high speed in the case of switching of operation of the electric rotating machine, it becomes possible to change the interruption speed of the field current on the basis of a toque command value from the outside, whereby smooth switching of operation becomes possible in a system such as brake coordination control, in which the torque difference may influence on a driver directly.

Moreover, even when an abnormal voltage fluctuation such as a load dump surge is generated, residual magnetic flux of the field winding can be reduced at a high speed, whereby a breakage of a battery and/or other electrical loads can be prevented.

The foregoing and other objects, features, and advantageous effects of the present invention will become more apparent from detailed description in the following embodiments and description in the accompanying drawings.

DETAILED DESCRIPTION OF THE INVENTION

Figure 1:
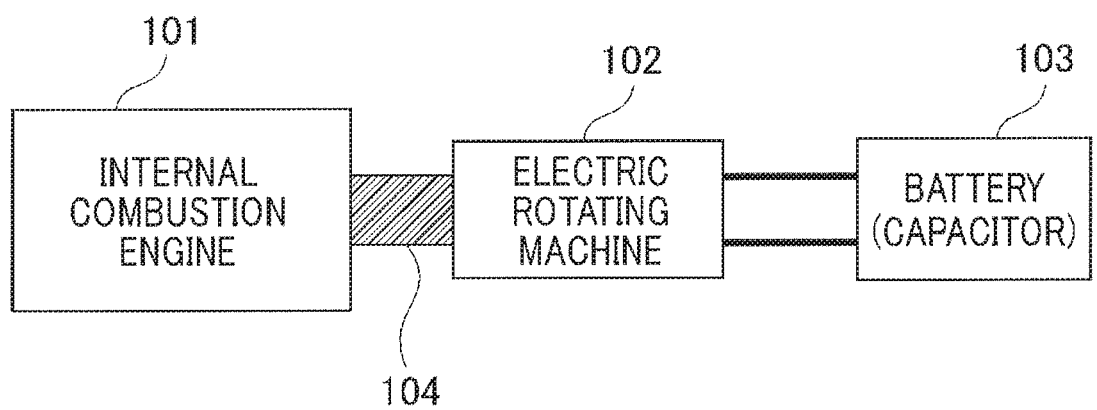
FIG. 1 is a schematic configuration diagram of a control device of an electric rotating machine in Embodiment 1 of the present invention.

Hereinafter, preferred embodiments of a control device of an electric rotating machine according to the present invention will be described with reference to the drawings. Incidentally, the same reference numerals as those shown in the respective drawings represent identical or corresponding elements.

Embodiment 1

FIG. 1 is a conceptual diagram showing the whole system configuration of a control device of an electric rotating machine in Embodiment 1 of the present invention.

In the control device of the electric rotating machine in FIG. 1, an internal combustion engine 101 is connected to an electric rotating machine 102 via a power transmitter 104 such as a belt; and AC voltage generated in the electric rotating machine 102 during the operation of the internal combustion engine 101 is AC-DC converted by a power converter (not shown in the drawing) to supply electrical energy to a DC apparatus (not shown in the drawing) and to charge the electrical energy to a battery (also referred to as a capacitor) 103 at the same time.

On the other hand, during stop of the internal combustion engine 101 by an idling stop or the like, the electrical energy of the battery (capacitor) 103 is converted into rotational energy by the power converter (not shown in the drawing) of the electric rotating machine 102 to restart the internal combustion engine 101.

Figure 2:
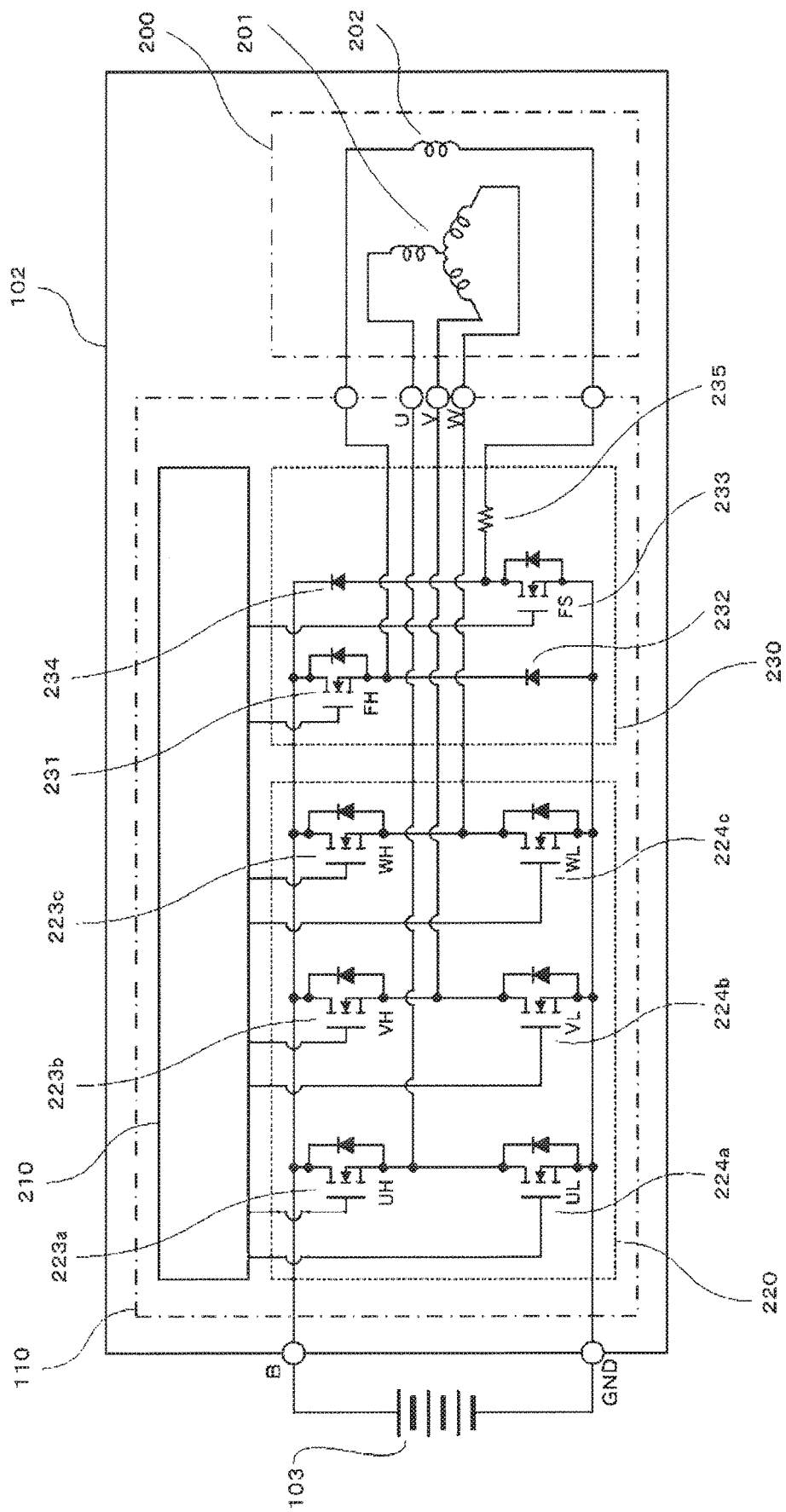
FIG. 2 is a schematic configuration diagram of the control device of the electric rotating machine in Embodiment 1 of the present invention.

FIG. 2 is a schematic configuration diagram of the control device of the electric rotating machine in Embodiment 1 of the present invention.

In FIG. 2, the electric rotating machine 102 is composed of a power conversion device 110 and a rotating machine unit 200; and the power conversion device 110 includes abridge circuit 220, a field circuit 230, and a control unit 210 that performs ON/OFF control or the like of switching elements.

The bridge circuit 220 is composed of: three phase upper (positive pole side) arm switching elements 223a, 223b, 223c, each incorporating a parasitic diode and three phase lower (negative pole side) arm switching elements 224a, 224b, 224c, each similarly incorporating a parasitic diode. Hereinafter, when the switching elements are generically termed, suffixes of "a" to "c" are omitted. Furthermore, the three phase upper arm switching elements 223 are connected to a B terminal of plus power supply input from the battery (capacitor) 103 and to each terminal of U, V, and W phases of a three phase armature winding 201 of the electric rotating machine 200; and the three phase lower arm switching elements 224 are connected to a GND terminal serving as ground input from the battery (capacitor) 103 and to each terminal of U, V, and W phases of the three phase armature winding 201.

The field circuit 230 includes: a positive pole side field switching element 231 which is for performing PWM control of field current that flows in the field winding 202; a free wheel diode 232 connected in series to the switching element 231; a negative pole side field switching element 233 which is for interrupting the field current that flows in the field winding 202 at a high speed; and a free wheel diode 234 connected in series to the switching element 233.

Incidentally, although FIG. 2 shows the three phase field winding type electric rotating machine in which the rotary rotating machine 200 has the three phase armature winding 201 and the field winding 202, a winding system and the number of phases may be different. Further, although there is shown the electric rotating machine 102 of an integral structure type in which the power conversion device 110 and the rotating machine unit 200 are integrated, there may be the electric rotating machine 102 of a separate structure type in which the power conversion device 110 and the rotating machine unit 200 are physically divided.

Figure 3:
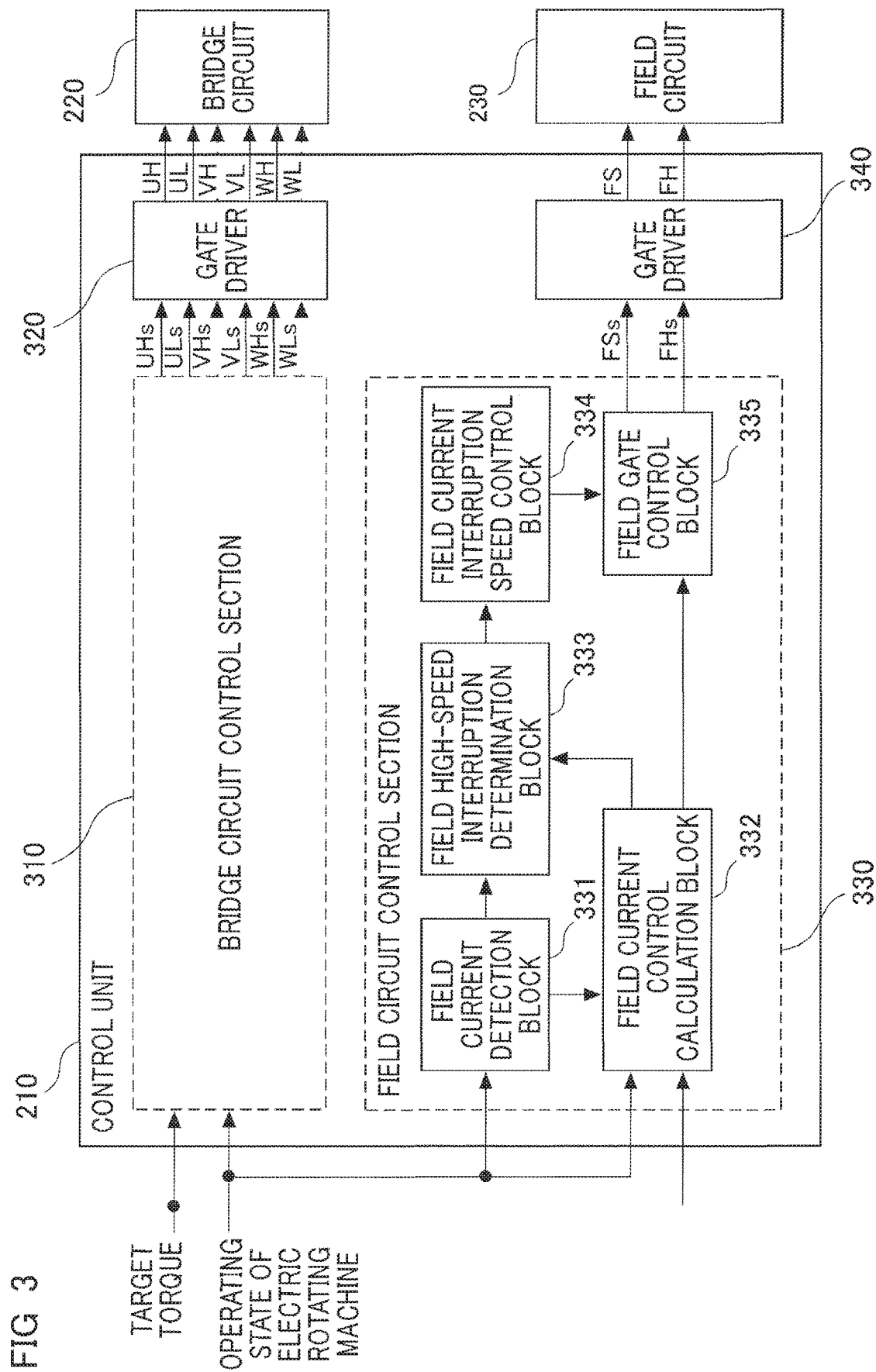
FIG. 3 is a configuration diagram showing details of a control unit 210 of the control device of the electric rotating machine in Embodiment 1 of the present invention.

FIG. 3 is a configuration diagram showing details of the control unit 210 of the control device of the electric rotating machine in Embodiment 1 of the present invention.

In FIG. 3, the control unit 210 is composed of: a bridge circuit control section 310 that controls the bridge circuit 220 for the three phase armature winding 201 of the electric rotating machine; a gate driver 320; a field circuit control section 330 that controls the field circuit 230 for the field winding 202 of the electric rotating machine; and a gate driver 340. The field circuit control section 330 further includes: a field current detection block 331 that detects a field current value from operating state information of the electric rotating machine; a field current control calculation block 332 that calculates a control value of the field circuit 230 from the output of the field current detection block 331 and target torque; a field high-speed interruption determination block 333 that outputs a determination value as to whether or not high-speed interruption of the field current is needed from the output of the field current detection block 331 and the output of the field current control calculation block 332; a field current interruption speed control block 334 which calculates interruption speed necessary for interruption of the field current from the output of the field high-speed interruption determination block 333 and controls the interruption speed of the field current in response to a calculation result thereof; and a field gate control block 335 that actually outputs operation signals of an upper (positive pole side) gate and a lower (negative pole side) gate of the field circuit 230 in response to the output from the field current control calculation block 332 and the output from the field current interruption speed control block 334.

The thus configured control device of the electric rotating machine in Embodiment 1 supplies torque to the internal combustion engine 101 as an electric motor at the time of starting of the internal combustion engine 101; and after starting, the control device performs control of the electric rotating machine 102 so as to charge the battery 103 as a generator as needed.

For example, since a control is made so that the rotational torque corresponds to the target torque in a driving mode in which rotational torque of the electric rotating machine 102 is controlled, feedback control is performed to calculate armature current and field current command by using the number of rotation serving as an operating state of the rotating machine unit 200, a B terminal voltage, current values of the three phase armature winding 201 and the field winding 202, and the like, as inputs to the bridge circuit control section 310 and the field circuit control section 330.

The bridge circuit control section 310 calculates a current target value that is to be outputted to the three phase armature winding 201 based on the number of rotation serving as the operating state of the rotating machine unit 200, the B terminal voltage, and the target torque; and the bridge circuit control section 310 outputs PWM signals UHs, ULs, VHs, VLs, WHs, WLs to the gate driver 320 so as to follow the calculated current target value and controls gates UH, UL, VH, VL, WH, WL of the bridge circuit 220.

On the other hand, the field circuit control section 330 calculates a field current target value that is to be outputted to the field winding 202 based on the number of rotation serving as the operating state of the rotating machine unit 200, the B terminal voltage, and the target torque; and the field circuit control section 330 outputs PWM signals FHs, FSs to the gate driver 340 so as to follow the calculated field current target value and controls gates FH, FS of the field circuit 230.

Figure 4:
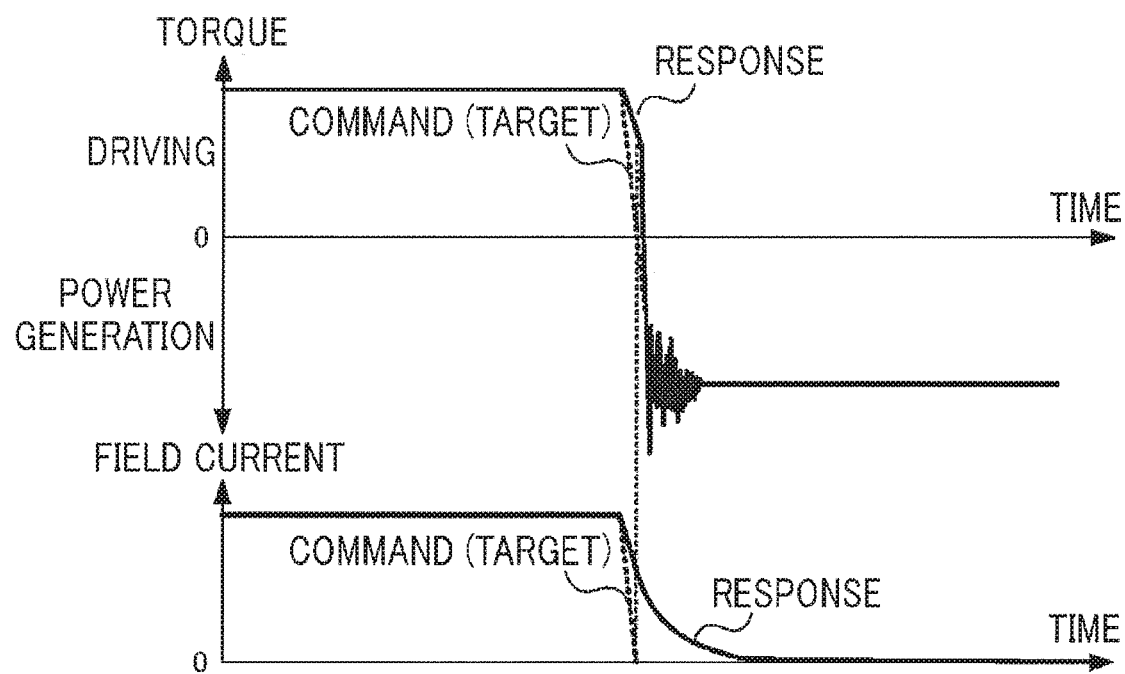
FIG. 4 is a waveform showing a state where unintentional large power generation torque is generated in Embodiment 1 of the present invention.

Here, since the field winding 202 is larger in inductance as compared to the three phase armature winding 201, control responsiveness is low; and as shown in FIG. 4, in the case of switching the target torque from driving to power generation, it becomes a state where the field current value does not drop at the time of target torque 0 Nm and residual magnetic flux is generated in the field winding. Accordingly, if the three phase armature winding 201 is controlled at the current target value of power generation in such a state, it is likely to generate unintentional large power generation torque and/or to change the torque rapidly.

Figure 6:
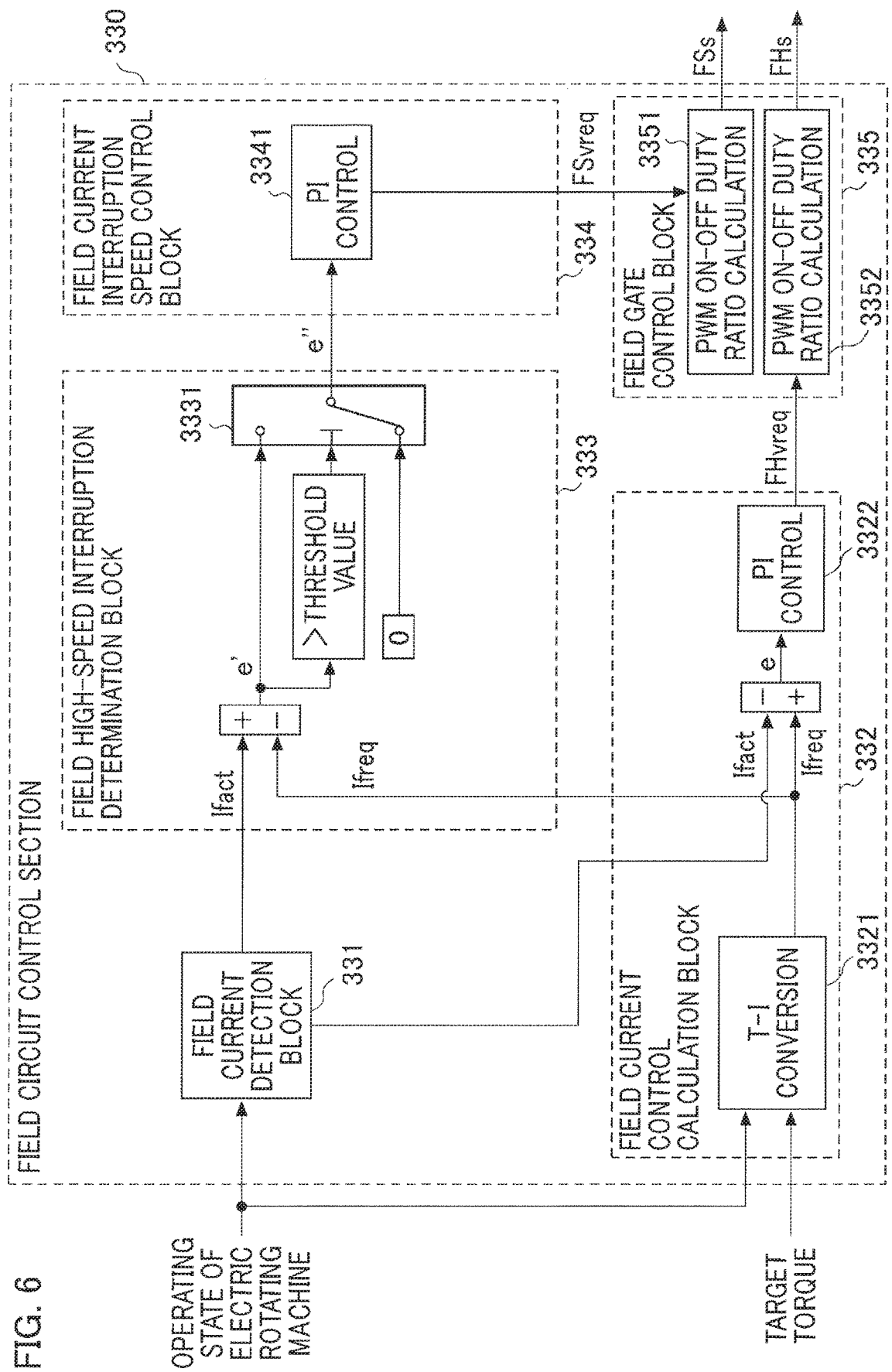
FIG. 6 is a configuration diagram showing details of a field circuit control section 330 of the control device of the electric rotating machine in Embodiment 1 of the present invention.

FIG. 6 is a configuration diagram showing details of the field circuit control section 330 of the control device of the electric rotating machine in Embodiment 1 of the present invention. In FIG. 6, the field current detection block 331 detects the current that flows in the field winding by performing AD conversion or the like of a signal from a shunt resistor 235 of FIG. 2, and outputs a field current value Ifact.

The field current control calculation block 332 includes: a torque-field current (T-I) conversion table 3321 that outputs a field current control command value (hereinafter, referred to as only "field current target value") Ifreq, which is to be applied to the field winding, from the target torque and the operating state of the electric rotating machine; and a first proportional-integral (PI) control portion 3322 which is for outputting an upper (positive pole side) gate voltage target value FHvreq of the field circuit 230 from the difference e between the field current target value Ifreq and the field current value Ifact.

The field high-speed interruption determination block 333 includes a switch 3331 which outputs an absolute value e' of the difference when the field current target value Ifreq is lower than the field current value Ifact from a preliminarily defined threshold value and outputs 0 as e'' when other than that.

The field current interruption speed control block 334 includes a second PI control portion 3341 that outputs a lower (negative pole side) gate voltage target value FSvreq of the field circuit 230 so that e' serving as the output of the field high-speed interruption determination block 333 becomes 0.

The field gate control block 335 includes PWM ON-OFF duty ratio calculation portions 3351, 3352 which generate signals FSs, FHs of intermittent switching (PWM) of the field switching elements in order to follow the output FSvreq of the field current interruption speed control block 334 and the output FHvreq of the field current control calculation block 332, respectively.

Figure 5:
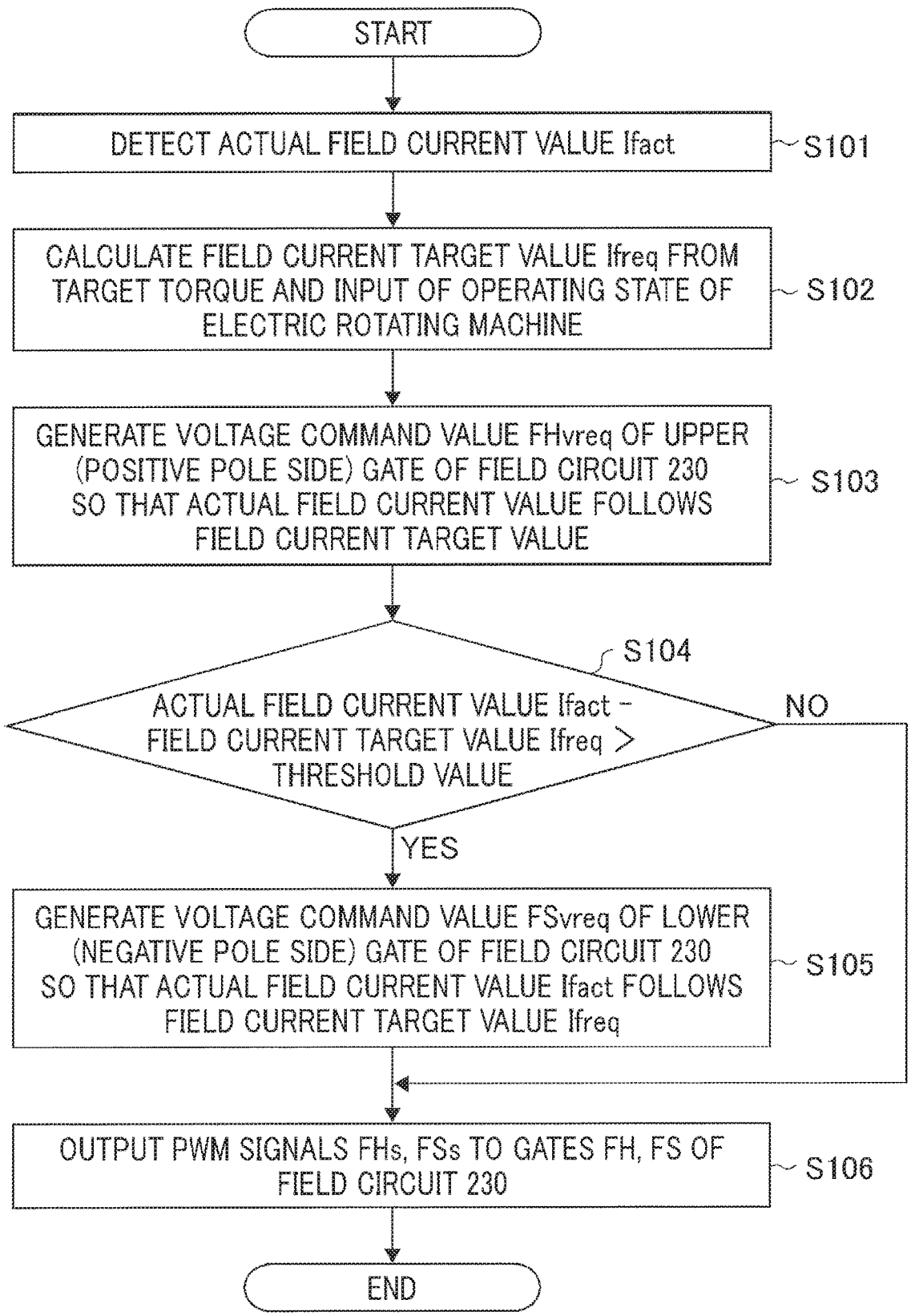
FIG. 5 is a flow chart showing the operation of a field circuit control section 330 of the control device of the electric rotating machine in Embodiment 1 of the present invention.

FIG. 5 is a flow chart showing the operation of the field circuit control section 330 of the control device of the electric rotating machine in Embodiment 1 of the present invention.

In Step S101, the field current detection block 331 obtains the actual field current value Ifact.

In Step S102, the field current control calculation block 332 calculates the field current control command value, that is, the field current target value Ifreq by the T-I conversion table 3321 from the target torque and the input of the operating state of the electric rotating machine.

In Step S103, the first PI control portion 3322 generates the voltage command value FHvreq of the upper (positive pole side) gate FH of the field circuit 230 so that the actual field current value Ifact follows the field current target value Ifreq.

On the other hand, in Step S104, the field high-speed interruption determination block 333 compares the actual field current value Ifact serving as the output of the field current detection block 331 with the field current target value Ifreq serving as the output of the field current control calculation block 332; and when the actual field current value Ifact does not follow falling speed of the field current target value Ifreq (more specifically, the difference e' is larger than the threshold value), "determination value e' of performing field high-speed interruption=difference value e'" is outputted by the switch 3331 and the processing proceeds to Step S105. If not, "e"=0" is outputted and the processing proceeds to Step S106.

In Step S105, the field current interruption speed control block 334 generates the voltage command value FSvreq of the lower (negative pole side) gate FS of the field circuit 230 by the second PI control portion 3341 so that the difference e' between the field current target value Ifreq and the actual field current value Ifact becomes 0.

In Step S106, in response to the voltage command values FHvreq, FSvreq serving as the outputs of the field current control calculation block 332 and the field current interruption speed control block 334, the field gate control block 335 converts these outputs into the PWM signals FHs, FSs which correspond to each voltage command duty ratio of the upper (positive pole side) gate FH and the lower (negative pole side) gate FS of the field circuit 230 and outputs the PWM signals FHs, FSs to the gate driver 340 by the PWM ON-OFF duty ratio calculation portions 3351, 3352, respectively.

As described above, according to the control device of the electric rotating machine in Embodiment 1 of the present invention, the lower (negative pole side) gate FS becomes normally ON (short-circuit) and the field current during the normal time (the output e" of the field high-speed interruption determination block is zero (e"=0)) is subjected to current feedback control by PWM intermittent switching by the upper (positive pole side) gate FH. If the field current target value Ifreq is rapidly lowered to reduce the field current at a high speed, OFF duty is generated in both FH and FS and both end gates of the field winding are close to an OFF state and therefore the current that flows in the field winding can be interrupted at a high speed.

Furthermore, the normal field current value can be arbitrarily controlled by the field current feedback control of the field current control calculation block 332 and interruption speed of the field current of the field winding can be arbitrarily controlled by feedback of interruption speed separation value of the field current interruption speed control block 334; and therefore, it is not needed to wait until the current that flows in the field winding becomes small at the time of switching of operation, for instance, from power generation to driving and/or from driving to power generation in the electric rotating machine and switching can be performed at a high speed.

Moreover, even when an abnormal voltage fluctuation such as a load dump surge is generated, the residual magnetic flux of the field winding can be reduced at a high speed; and therefore, a breakage of the battery and/or other electrical loads can be prevented.

Embodiment 2

Figure 7:
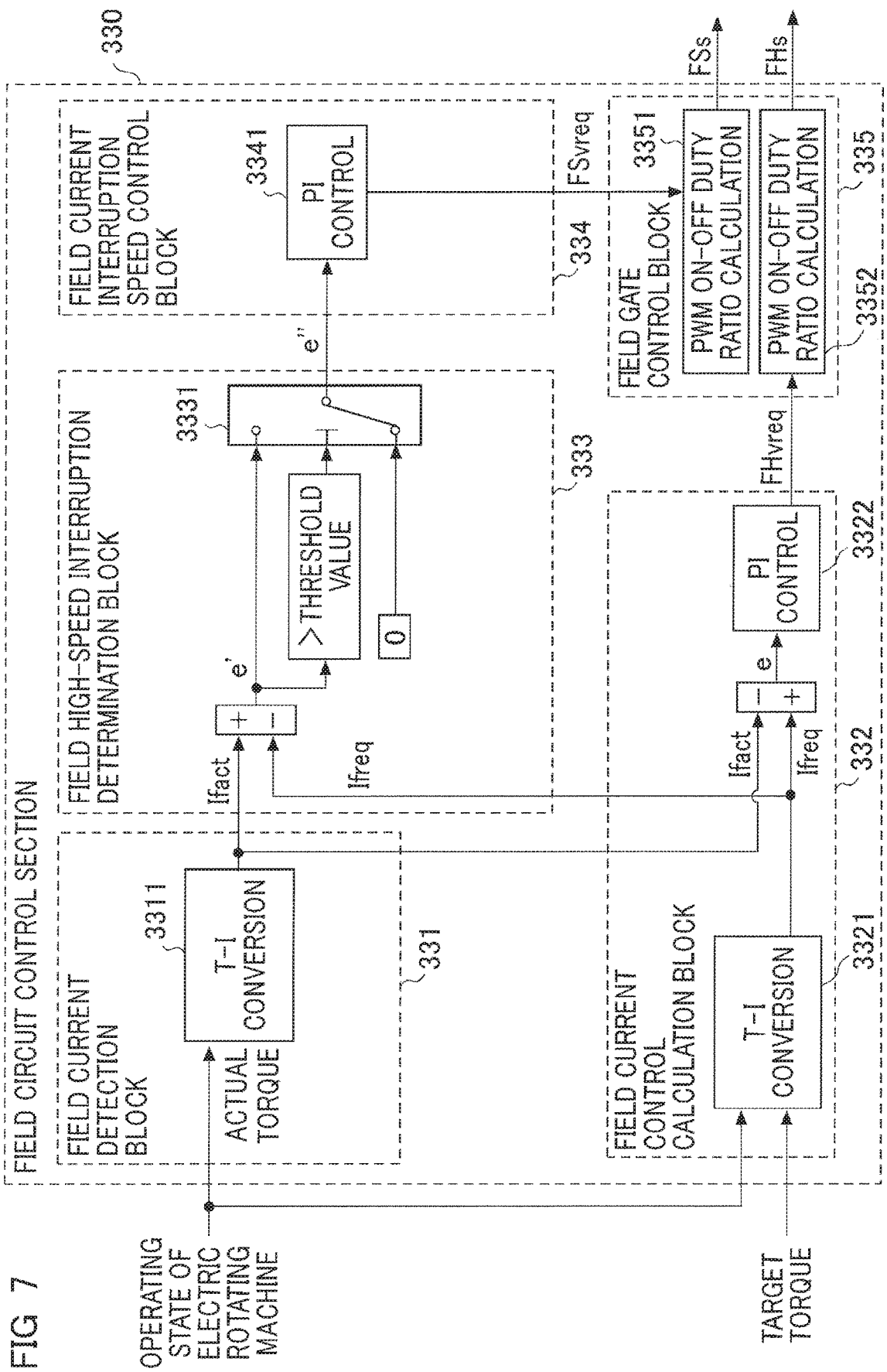
FIG. 7 is a configuration diagram showing details of a field circuit control section 330 of a control device of an electric rotating machine in Embodiment 2 of the present invention.

FIG. 7 is a configuration diagram showing details of a field circuit control section 330 of a control device of an electric rotating machine in Embodiment 2 of the present invention.

In FIG. 7, a field current detection block 331 includes: a torque detector such as a strain gauge, which detects an actual torque value generated in a power transmitter 104 from an inputted operating state of the electric rotating machine; and a torque-field current (T-I) conversion table 3311 that converts the detection value of the torque detector into a field current value. The field current detection block 331 is configured to convert the detected actual torque into an actual field current value Ifact and to output the actual field current value Ifact. Incidentally, other configuration is the same as Embodiment 1.

AS described above, the same effects as Embodiment 1 can be obtained as also a configuration which detects output torque of the rotor and controls interruption speed of field current so that the output torque corresponds to target torque. Furthermore, as the torque detector, if the output torque of the rotor can be detected, other torque sensor and a method such as torque estimation calculation can be used.

Embodiment 3

Figure 8:
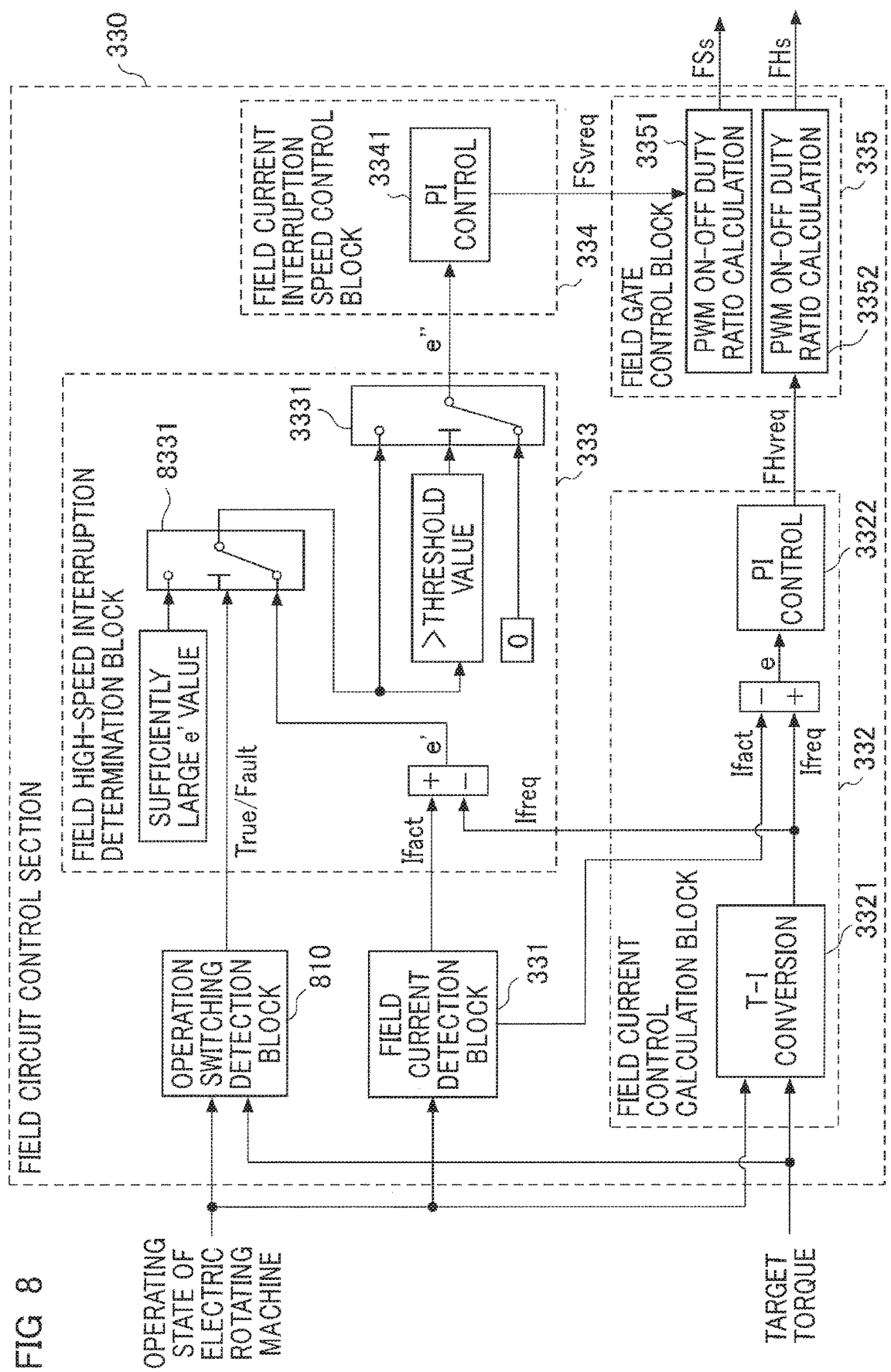
FIG. 8 is a configuration diagram showing details of a field circuit control section 330 of a control device of an electric rotating machine in Embodiment 3 of the present invention.

FIG. 8 is a configuration diagram showing details of a field circuit control section 330 of a control device of an electric rotating machine in Embodiment 3 of the present invention.

In FIG. 8, an operation switching detection block 810 detects switching of control operation, for instance, power generation, driving, braking, and output stopping from an inputted operating state of the electric rotating machine. As a method, it is conceivable to detect a change in reference letter (zero cross) of target torque and/or to detect by receiving of a switching command of control operation from a superordinate controller (not shown in the drawing).

If the operation switching detection block 810 detects the switching of control operation, the operation switching detection block 810 outputs a logical value True and outputs Fault in the case of no switching.

A field high-speed interruption determination block 333 further includes a second switch 8331 which outputs the difference e' between an actual field current value Ifact and a field current target value Ifreq when the output of the operation switching detection block 810 is Fault and outputs e' in a larger value in the case of True. Incidentally, other configuration is the same as Embodiment 1.

According to the thus configured Embodiment 3, since the field current can be interrupted at a higher speed in the case of switching operation of the electric rotating machine, smooth switching of operation becomes possible by a system such as brake coordination control, in which a torque difference may influence on a driver directly.

Incidentally, the present invention can freely combine the respective embodiments and appropriately modify and/or omit the respective embodiments, within the scope of the present invention.

Figure 9:
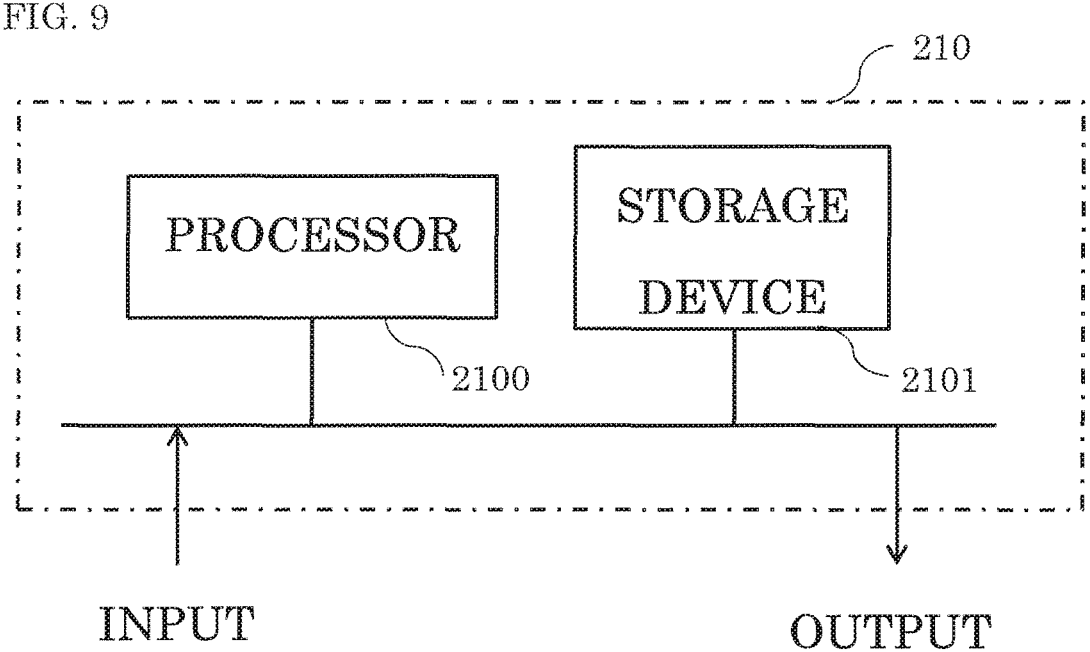
FIG. 9 is a conceptual diagram showing an example of hardware of a control unit used in the present invention.

FIG. 9 shows an example of hardware of the control unit 210. The control unit 210 is composed of a processor 2100 and a storage unit 2101 as shown in FIG. 9. The storage unit 2101 includes, although not shown, a volatile storage device such as a random access memory, and a nonvolatile auxiliary storage device such as a flash memory. The storage unit 2101 may include, instead of a flash memory, an auxiliary storage device such as a hard disk. The processor 2100 executes a program loaded from the storage unit 2101. In this case, the program is loaded from the auxiliary storage device to the processor 2100 via the volatile storage device. The processor 2100 may output data of the calculation result and the like to the volatile storage device of the storage unit 2101, or may store the data in the auxiliary storage device via the volatile storage device.

What is claimed is:

1. A control device of an electric rotating machine having an armature winding and a field winding, the control device of the electric rotating machine comprising:
   a bridge circuit configured to include positive pole side arm switching elements and negative pole side arm switching elements, and to rectify AC current serving as the output of said armature winding into DC current;
   a field circuit configured to perform current conduction control of said field winding by using field switching elements; and
   a main controller configured to include a bridge circuit controller and a field circuit controller, the bridge circuit controller and the field circuit controller performing control of ON and OFF of said switching elements of said bridge circuit and said field circuit, respectively,
   said field circuit including:
      a positive pole side field switching element configured to perform PWM control of field current that flows in said field winding; and
      a negative pole side field switching element configured to interrupt the field current that flows in said field winding,
   said field circuit controller of said main controller including:
      a field current detector configured to detect an actual field current value Ifact from operating state information of said electric rotating machine;
      a field current control calculator configured to calculate a field current target value Ifreq from target torque and an operating state of said electric rotating machine, and to output a gate voltage target value FHvreq of an upper (positive pole side) gate FH of said field circuit from the difference between the calculated field current target value Ifreq and the actual field current value Ifact detected by said field current detector;
      a field high-speed interruption evaluator configured to compare the actual field current value Ifact serving as the output of said field current detector with the field current target value Ifreq calculated by said field current control calculator, and to output a determination value as to whether or not to interrupt the field current at high-speed in response to the difference between the calculated field current target value Ifreq and the actual field current value Ifact;
      a field current interruption speed controller configured to output a gate voltage target value FSvreq of a lower (negative pole side) gate FS of said field circuit so that the difference between the field current target value Ifreq and the actual field current value Ifact becomes zero from the output of said field high-speed interruption evaluator, and to control the interruption speed of the field current; and
      a field gate controller configured to output operation signals of the upper (positive pole side) gate FH and the lower (negative pole side) gate FS of said field circuit in response to the gate voltage target value FHvreq serving as the output from said field current control calculator and the gate voltage target value FSvreq serving as the output from said field current interruption speed controller,
   wherein the field current that flows in said field winding is interrupted by turning OFF said positive pole side and negative pole side switching elements of said field winding in response to the output of said field high-speed interruption evaluator; and
   the interruption speed of the field current that flows in said field winding is controlled by intermittently driving said negative pole side switching element, the interruption speed being a speed at which the field current value Ifact becomes zero.

2. The control device of the electric rotating machine according to claim 1,
   wherein said field high-speed interruption evaluator includes switches configured to output a determination value, the switches configured to interrupt the field current based on the difference between both values of a field current value detected by said field current detector and a field current target value calculated by said field current control calculator.

3. The control device of the electric rotating machine according to claim 1,
   wherein said field current control calculator includes:
      a torque-field current (T-I) conversion table configured to detect a field current target value from a target torque and an operating state of said electric rotating machine; and
      a PI controller configured to output a gate voltage target value of the upper (positive pole side) gate of said field circuit from the difference between the field current target value detected by said T-I conversion table and the field current value detected by said field current detector.

4. The control device of the electric rotating machine according to claim 1,
   wherein said field current detector includes: a torque detector configured to detect an actual torque value generated in a power detector of said electric rotating machine; and
   a torque-field current (T-I) conversion table configured to convert the torque detection value of said torque detector into the field current value.

5. The control device of the electric rotating machine according to claim 2,
   wherein said electric rotating machine includes at least two operations from among power generation operation, driving operation, braking operation, and idling operation;
   said field circuit controller includes an operation switching detector configured to detect switching from the present operation state to other operation state of said electric rotating machine; and
   said field high-speed interruption evaluator includes a second switch configured to output a determination value, the second switch being configured to interrupt the field current at a high speed in response to the output of said operation switching detector.

* * * * *